United States Patent
Laimboeck et al.

(10) Patent No.: US 10,221,758 B2
(45) Date of Patent: Mar. 5, 2019

(54) POWER UNIT

(71) Applicant: Obrist Technologies GmbH, Lustenau (AT)

(72) Inventors: Franz Laimboeck, Thal (AT); Frank Obrist, Bregenz (AT)

(73) Assignee: OBRIST TECHNOLOGIES GMBH, Lustenau (AT)

( * ) Notice: Subject to any disclaimer, the term of this patent is extended or adjusted under 35 U.S.C. 154(b) by 0 days.

(21) Appl. No.: 15/519,398

(22) PCT Filed: Sep. 28, 2015

(86) PCT No.: PCT/EP2015/072198
§ 371 (c)(1),
(2) Date: Apr. 14, 2017

(87) PCT Pub. No.: WO2016/058811
PCT Pub. Date: Apr. 21, 2016

(65) Prior Publication Data
US 2017/0234214 A1   Aug. 17, 2017

(30) Foreign Application Priority Data
Oct. 16, 2014   (DE) .................. 10 2014 115 044

(51) Int. Cl.
*F02B 67/06* (2006.01)
*B60K 6/24* (2007.10)
(Continued)

(52) U.S. Cl.
CPC ............... *F02B 67/06* (2013.01); *B60K 6/24* (2013.01); *B60K 6/485* (2013.01); *F01B 1/10* (2013.01);
(Continued)

(58) Field of Classification Search
CPC .......... F02B 67/06; F02B 75/32; F02B 75/20; F02B 63/04; F02B 75/225; F02B 75/228;
(Continued)

(56) References Cited

U.S. PATENT DOCUMENTS

| | | | |
|---|---|---|---|
| 5,595,147 A | 1/1997 | Fueling | |
| 5,865,655 A * | 2/1999 | Hiraoka | F02B 61/045 123/195 HC |

(Continued)

FOREIGN PATENT DOCUMENTS

| | | |
|---|---|---|
| CN | 2071139 U | 2/1991 |
| CN | 201367943 Y | 12/2009 |

(Continued)

OTHER PUBLICATIONS

German Search Report for German Patent Application No. 10 2014 115 044.9, dated Jun. 12, 2015, 9 pages.
(Continued)

*Primary Examiner* — Jacob Amick
*Assistant Examiner* — Charles Brauch
(74) *Attorney, Agent, or Firm* — Westman, Champlin & Koehler, P.A.

(57) ABSTRACT

The invention relates to a power unit, in particular for a hybrid vehicle, having a two-cylinder reciprocating piston engine which comprises two pistons guided in two cylinders in a tandem arrangement and two counter-rotating crankshafts connected to the pistons by connecting rods, and having an alternator that can rotate in the opposite direction to the first crankshaft and in the same direction as the second crankshaft. The invention is characterized in that the alternator is in driving engagement with at least the first crankshaft via a traction mechanism and comprises a counterbalance, wherein the first crankshaft is connected via a timing chain or a timing belt to a balancing shaft which carries a
(Continued)

further balancing mass. The invention also relates to a vehicle, in particular a hybrid vehicle, having such a power unit.

6 Claims, 1 Drawing Sheet

(51) Int. Cl.
*F02B 63/04* (2006.01)
*F01B 1/10* (2006.01)
*F02B 75/22* (2006.01)
*B60K 6/485* (2007.10)
*F02B 75/20* (2006.01)
*F02B 75/32* (2006.01)
*F02B 75/18* (2006.01)
*F16F 15/26* (2006.01)

(52) U.S. Cl.
CPC .............. *F02B 63/04* (2013.01); *F02B 75/20* (2013.01); *F02B 75/225* (2013.01); *F02B 75/32* (2013.01); *B60Y 2200/92* (2013.01); *F02B 75/228* (2013.01); *F02B 2075/1808* (2013.01); *F16F 15/264* (2013.01); *Y02T 10/6226* (2013.01); *Y02T 10/6295* (2013.01); *Y10S 903/905* (2013.01)

(58) Field of Classification Search
CPC ... F02B 2075/1808; B60K 6/485; B60K 6/24; F01B 1/10; F16F 15/264; Y10S 903/905; B60Y 2200/92; Y02T 10/6295; Y02T 10/6226

See application file for complete search history.

(56) References Cited

U.S. PATENT DOCUMENTS

| 7,024,858 | B2 | 4/2006 | Gray, Jr. | |
|---|---|---|---|---|
| 7,533,639 | B1 | 5/2009 | Berger et al. | |
| 8,267,056 | B2 | 9/2012 | Dean | |
| 9,103,276 | B2 | 8/2015 | Obrist | |
| 2009/0107426 | A1 | 4/2009 | Berger et al. | |
| 2010/0222170 | A1* | 9/2010 | Yasuta | F16G 13/04 474/140 |
| 2012/0111298 | A1* | 5/2012 | Matsuo | F02F 7/0068 123/192.2 |
| 2012/0197471 | A1* | 8/2012 | Irisawa | B60K 6/445 701/22 |
| 2013/0199463 | A1 | 8/2013 | Pischinger et al. | |
| 2013/0239930 | A1* | 9/2013 | Leone | F16F 15/24 123/51 AA |

FOREIGN PATENT DOCUMENTS

| CN | 103282622 | A | 9/2013 | |
|---|---|---|---|---|
| CN | 204239064 | U | 4/2015 | |
| DE | 10237419 | A1 | 2/2004 | |
| DE | 102006009093 | A1 | 8/2007 | |
| DE | 102009037000 | A1 | 2/2011 | |
| DE | 102011013567 | A1 | 11/2011 | |
| DE | 102010025002 | A1 | 12/2011 | |
| GB | 463 278 | A | 3/1937 | |
| GB | 463278 | A * | 3/1937 | .............. F02B 73/00 |
| JP | H09-324649 | A | 12/1997 | |
| WO | 2012/056275 | A1 | 5/2012 | |
| WO | 2012/163902 | A1 | 12/2012 | |

OTHER PUBLICATIONS

International Preliminary Report on Patentability for PCT/EP2015/072198, dated Jan. 4, 2017, 19 pages.
International Search Report (in English) and Written Opinion (in German) for International Application No. PCT/EP2015/072198, dated Jan. 4, 2016, 8 pages.
Office Action, including Search Report, for Chinese Patent Application No. 201580068283.6, dated Nov. 2018, 7 pages.

* cited by examiner

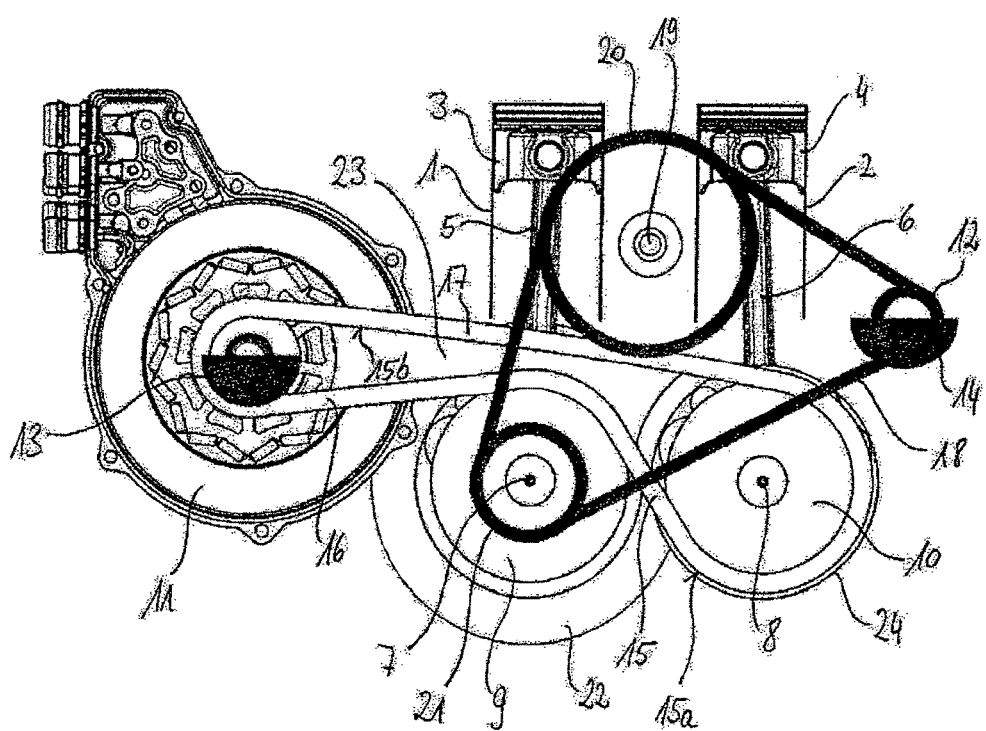

POWER UNIT

CROSS-REFERENCE TO RELATED APPLICATION

This Application is a Section 371 National Stage Application of International Application No. PCT/EP2015/072198, filed 28 Sep. 2015 and published as WO 2016/058811 A1 on 21 Apr. 2016, in German, the contents of which are hereby incorporated by reference in their entirety.

BACKGROUND

The invention relates to a power unit for a hybrid vehicle having a two-cylinder reciprocating piston engine which comprises two pistons guided in two cylinders in a tandem arrangement and two counter-rotating crankshafts connected to the pistons by connecting rods, and having a alternator that can rotate in the opposite direction to the first crankshaft and in the same direction as the second crankshaft. The invention additionally relates to a vehicle having such a power unit. A power unit of the above type is known, for example, from patent WO 2012/056275 A1.

The known power unit has a two-cylinder reciprocating piston engine with counter-rotating crankshafts, which are coupled to each other at their shaft journals by spur gears. The spur gears are in engagement with each other and synchronize the counter-rotating crankshafts. The reciprocating piston engine drives an alternator which is used for electricity generation. The alternator comprises an alternator gear wheel which meshes with one of the two crankshafts. In operation, the alternator rotates in the opposite direction to a first crankshaft and in the same direction as a second crankshaft.

The known power unit is used in particular in a hybrid vehicle, and therefore high running smoothness, low-vibration and a compact design are all important factors. These characteristics are already satisfied by the known power unit. Efforts are nevertheless being made to further improve these properties.

SUMMARY

The object of the invention is therefore to further develop the known power unit in such a way that it has improved properties with regard to running smoothness and low vibration, while in particular having compact dimensions. A further object of the invention is to specify a motor vehicle having such an improved power unit.

In accordance with the invention, this object is achieved in relation to the power unit by the subject matter set forth herein and in relation to a motor vehicle.

Thus the invention is based on the idea of proposing a power unit, in particular for a hybrid vehicle, having a two-cylinder reciprocating piston engine that has two pistons guided in two cylinders in a tandem arrangement. The two-cylinder reciprocating piston engine also has two counter-rotating crankshafts connected to the piston by connecting rods. The power unit comprises an alternator, which rotates in the opposite direction with respect to the first crankshaft and in the same direction with respect to the second crankshaft. In accordance with the invention the alternator is in driving engagement with at least the first crankshaft via a traction mechanism, and has a counterbalance. The first crankshaft is also connected via a timing chain or a timing belt to a balancing shaft, which carries a further counterbalance.

By virtue of the alternator carrying a balancing mass, the alternator already acts as the first balancing shaft. The alternator therefore fulfils a dual function, namely the production of electricity on the one hand and the balancing of inertial forces on the other. Consequently, the alternator thus designed contributes to improved running smoothness. To completely compensate for the second order inertial forces, only a single separate balancing shaft is therefore required. A compact structure of a power unit is therefore implemented, which in spite of a complete Lanchester balancing, still shows significant improvements in terms of running smoothness and low vibration levels.

In a preferred variant it can be provided that the traction mechanism is a toothed belt or toothed chain. The use of a toothed belt enables a particularly low-noise design. The use of a toothed chain also facilitates another noise-reducing design, while also providing a high wear resistance. In addition, the toothed chain has advantages in terms of oil lubrication of the reciprocating piston engine.

In the case of a variant of the invention, the first crankshaft and the second crankshaft can be in direct gear engagement with each other. In other words, on each of their end faces the crankshafts can comprise sprockets or toothed crank cheeks that are in engagement with each other. The first crankshaft is additionally connected to the alternator via the traction mechanism and is connected to the balancing shaft via the timing chain.

A particularly preferred alternative provides that the traction mechanism is a toothed chain having teeth on both sides, wherein an outer side of the toothed chain engages with a sprocket of the first crankshaft and an inner side of the toothed chain engages with a sprocket of the second crankshaft. The toothed chain thus follows a relatively simple course, which is advantageous in terms of the force transmission from the sprockets to the alternator. In particular, the chain has a small number of deflection points under load. In addition, a direct gear engagement of the crankshafts with one another, or with the alternator, is avoided, which benefits the smooth running of the reciprocating piston engine.

In other preferred variants of the power unit according to the invention, it can be provided that the first crankshaft, or the balancing shaft, carries a flywheel mass. The function of the flywheel mass is to compensate for the alternating torques. Preferably, the flywheel mass is arranged on the first crankshaft, i.e. the crankshaft which rotates in the opposite direction to the alternator. Alternatively, the flywheel mass can be arranged on the balancing shaft, which depending on the installation position of the power unit in a motor vehicle, can be advantageous in order to provide a minimum possible width of the power unit in the plane of the crankshaft. It may also be provided that both the first crankshaft and the balancing shaft each carry a partial flywheel mass.

To compensate for the second-order inertial forces, it is advantageous if the translation ratio of the crankshaft to the alternator and/or to the balancing shaft is 2:1. Since the alternator with the balancing mass also acts as a balancing shaft, the translation ratio of 2:1 which is advantageous for the Lanchester balancing, i.e. the balancing of the free second-order inertial forces, should also be maintained here. This means that the balancing shaft and the alternator each rotate at double the speed relative to the crankshafts.

The first crankshaft can also comprise a control gear, which is coupled via the timing chain or the timing belt to an idler gear of a timing drive. The idler gear has a diameter equal to twice the diameter of the control gear. In other words, it is provided that the timing chain or timing belt couples the control gear of the first crankshaft to both the balancing shaft and the idler gear. The idler gear can be arranged on the end face of the timing drive. The use of double the size of the idler gear relative to the timing gear enables a translation ratio of 1:2 to be obtained between the crankshafts and the timing drive. The timing drive therefore rotates at half the speed of the crankshafts. This timing drive can be a deep-lying timing drive, which is arranged below the level of the cylinder seal of the reciprocating piston engine.

In an advantageous embodiment, the power unit according to the invention is a single alternator. The restriction to a single alternator not only benefits the compactness of the power unit, but also lowers the costs of production. Overall, a particularly efficient, low-noise and smooth-running power unit is created, which can be produced cost-effectively. At the same time the small number of whole components improves the maintainability of the power unit.

In accordance with a secondary aspect, a vehicle, in particular a hybrid vehicle, having a power unit as mentioned above is disclosed and claimed.

BRIEF DESCRIPTION OF FIGURE

The FIGURE shows a power unit in accordance with one example embodiment of the invention.

DETAILED DESCRIPTION

The invention is described hereafter in greater detail on the basis of an exemplary embodiment and by reference to the attached drawing. The single FIGURE shows a schematic side view of a power unit according to the invention, wherein components that are inessential to the invention are hidden.

The power unit shown in the FIGURE comprises a reciprocating piston engine with two cylinders 1, 2 (two-cylinder reciprocating piston engine), in which pistons 3, 4 are guided. The pistons 3, 4 are connected to crankshafts 7, 8 by means of connecting rods 5, 6. Each piston 3, 4 is assigned to one crankshaft 7, 8 each. The reciprocating piston engine therefore comprises two crankshafts 7, 8, arranged next to one another in parallel. The crankshafts 7, 8 rotate in opposite directions. This means that the two-cylinder reciprocating piston engine is implemented in a tandem design.

The crankshafts 7, 8 each carry sprockets 9, 10. The sprockets 9, 10 are spaced apart from one another and coupled together by a toothed chain 15. The toothed chain 15 is toothed on both sides, wherein an outer side 15a of the toothed chain 15 is in engagement with the sprocket 9 of the first crankshaft 7. An inner side 15b of the toothed chain 15 is in engagement with the sprocket 10 of the second crankshaft 8. The toothed chain 15 also passes to an alternator 11, the inner side 15b of the toothed chain 15 engaging in a gear wheel of the alternator 11. The alternator 11 is therefore coupled to the crankshafts 7, 8 by means of the toothed chain 15 and is driven by the crankshafts 7, 8. The alternator 11 in this case rotates in the opposite direction with respect to the first crankshaft 7 and in the same direction with respect to the second crankshaft 8.

In some sections the toothed chain 15 passes between the sprockets 9, 10 in a straight line, the straight section of the toothed chain 15 between the sprockets 9, 10 being preferably at least 30 mm long, in order to ensure an exact engagement of the individual teeth of the toothed chain 15 in the sprockets 9, 10.

As is clearly visible in the FIGURE, a driving side 16 of the toothed chain 15 runs between the alternator 11 and the first crankshaft 7, or sprocket 9 of the first crankshaft 7. A slack side 17 of the toothed chain 15 runs between the second crankshaft 8 or sprocket 10 of the second crankshaft 8 and the alternator 11. Since the distance between the sprocket 10 of the second crankshaft 8 and the alternator 11 is comparatively large, it is advantageous to provide a chain guide 23 between the alternator 11 and the second crankshaft 8. The chain guide 23 substantially prevents any sagging of the slack side 17 and thus contributes to the smooth running of the power unit.

On a shaft journal of the first crankshaft 7, a timing gear 21 is arranged. The timing gear 21 can be rigidly connected to the sprocket 10 of the first crankshaft 7. In any event, it is provided that a connection between the timing gear 21 and the sprocket 10 of the first crankshaft 7 is rotationally fixed. The timing gear 21 engages with a timing chain 18 that couples the timing gear 21 to a balancing shaft 12 and a timing drive 19. In particular, the timing chain 18 passes from the timing gear 21 to the balancing shaft 12 and further to an idler gear 20 that is seated on the front face of the timing drive 19. The idler gear 20 is preferably designed twice as large as the timing gear 21, so that a translation ratio of 2:1 is set between the timing drive 19 and the crankshafts 7, 8. The timing drive 19 can be advantageously designed as a deep-lying timing drive. Specifically, the timing drive 19 is preferably arranged below the level of the cylinder seal. This reduces the overall height of the power unit.

To balance out the second-order inertial forces, i.e. to provide the so-called Lanchester compensation, balancing masses 13, 14 are provided. One of these balancing masses 13 is arranged on the alternator 11. Rotating in phase with this but in the opposite direction, a further balancing mass 14 is arranged on the balancing shaft 12. Between the balancing shaft 12 or the alternator 11 and the crankshafts 7, 8 there exists a translation ratio of 1:2. In other words, both the alternator 11 and the balancing shaft 12 rotate twice as fast as the crankshafts 7, 8. The rotation of the balancing shaft 12 and the alternator 11 are each in opposite directions to one another, so as to ensure an efficient balancing of the second-order inertial forces.

To compensate for the alternating torques, which occur due to the ignition order of the reciprocating piston engine in 4-cycle operation, a flywheel mass 22 is provided, which is connected to the first crankshaft 7. The flywheel mass 22 is preferably arranged on a reverse side of the reciprocating piston engine. In other words, at its longitudinal ends the first crankshaft 7 comprises a shaft journal, wherein the sprocket 9 and the timing gear 21 are located on a first, frontal shaft journal. On a second shaft journal, opposite to the first, the flywheel mass 22 is rotationally fixed. A further flywheel mass 24 can be connected to the second crankshaft 8. The flywheel mass 24 which is assigned to the second crankshaft 8 is preferably smaller than the flywheel mass 22 of the first crankshaft 7.

LIST OF REFERENCE NUMERALS

1, 2 cylinder
3, 4 piston
5, 6 connecting rod
7 first crankshaft
8 second crankshaft
9, 10 sprockets
11 alternator
12 balancing shaft 13, 14 balancing masses
15 toothed chain
15*a* outer side
15*b* inner side
16 driving side
17 slack side
18 timing chain
19 timing drive
20 idler wheel
21 timing gear
22, 24 flywheel masses
23 chain guide

The invention claimed is:

1. Power unit, in particular for a hybrid vehicle, having a two-cylinder reciprocating piston engine which comprises two pistons guided in two cylinders in a tandem arrangement and two counter-rotating crankshafts connected to the pistons by connecting rods, and having a alternator that can rotate in the opposite direction to the first crankshaft and in the same direction as the second crankshaft, characterized in that the alternator is in driving engagement with at least the first crankshaft via a traction mechanism and comprises a counterbalance, wherein the first crankshaft is connected via a timing chain or a timing belt to a balancing shaft carrying a further balancing mass, the traction mechanism being a toothed chain having teeth on both sides and an outer side of the toothed chain engaging with a sprocket of the first crankshaft and an inner side engaging with a sprocket of the second crankshaft.

2. Power unit according to claim 1, characterized in that the first crankshaft or the balancing shaft carries a flywheel mass.

3. Power unit according to claim 1, characterized in that a translation ratio of the crankshafts to the alternator and/or to the balancing shaft is 2:1.

4. Power unit according to claim 1, characterized in that the first crankshaft comprises a timing gear, which is coupled via the timing chain or the timing belt to an idler gear of a timing drive, the diameter of which is twice the diameter of the timing gear.

5. Power unit according to claim 1, characterized in that a single alternator is provided.

6. Motor vehicle, in particular hybrid vehicle, having a power unit according to claim 1.

* * * * *